United States Patent [19]

Ono

[11] Patent Number: 4,498,643
[45] Date of Patent: Feb. 12, 1985

[54] AUTOMATIC LOCKING RETRACTOR

[75] Inventor: Katsuyasu Ono, Fujisawa, Japan

[73] Assignee: NSK-Warner K.K., Japan

[21] Appl. No.: 550,578

[22] Filed: Nov. 10, 1983

[30] Foreign Application Priority Data

Nov. 17, 1982 [JP] Japan .......................... 57-173900[U]

[51] Int. Cl.³ ...................... A62B 35/00; B65H 75/48
[52] U.S. Cl. ............................................. 242/107.4 D
[58] Field of Search ............................ 242/107.4 RE;
280/806–808; 297/474–480

[56] References Cited

U.S. PATENT DOCUMENTS

| | | | |
|---|---|---|---|
| 3,174,704 | 3/1965 | Replogle | 242/107.4 D |
| 3,598,336 | 8/1971 | Frost | 242/107.4 D |
| 3,659,801 | 5/1972 | Romanzi, Jr. | 242/107.4 D |
| 3,809,332 | 5/1974 | Hayashi | 242/107.4 D |
| 4,280,584 | 7/1981 | Makishima | 242/107.4 A |

Primary Examiner—John M. Jillions
Attorney, Agent, or Firm—Cantor and Lessler

[57] ABSTRACT

Disclosed herein is an automatic locking retractor suitable for use in a vehicle seat belt. The retractor does not produce any substantial unpleasant noise when the webbing is wound up, because its cog wheels and lock lever are kept separated while the webbing is wound up. The retractor features use of a ratchet wheel, latch gear and control member. The ratchet wheel and latch gear are rotatable together with the cog wheels. The control member is normally kept in engagement with the latch gear but can assume a first and second working positions when the webbing is pulled out and taken up respectively. At the working positions, the control member is kept in contact with the path of rotation of the circumference of the latch gear. When the webbing is pulled out, the pawl engages with the control member but is kept out of engagement with the ratchet wheel. When the webbing is then wound back over a small length, the pawl is disengaged from the control member but is then kept engageable with the ratchet wheel. When the webbing is pulled out again, the pawl is brought into engagement with the ratchet wheel and the lock lever is brought into engagement with the cog wheels to restrain any further release of the webbing.

6 Claims, 8 Drawing Figures

AUTOMATIC LOCKING RETRACTOR

BACKGROUND OF THE INVENTION

1. Field of the Invention

This invention relates to an automatic locking retractor suitable for use in a vehicle seat belt system and producing little unpleasant noise when winding the webbing into the retractor.

2. Description of the Prior Art

In a vehicle seat belt equipped with a so-called automatic locking retractor, the webbing wound up on the retractor is pulled out and worn by the occupant. The webbing is then allowed to be wound back on the retractor over any extra length thereof. When the occupant tries to pull out the webbing again, the webbing is restrained from any further release. A variety of different types of such automatic locking retractors has been proposed and actually used to date (see, for example, U.S. Pat. No. 3,412,952 issued Nov. 26, 1968 to Wohlert et al, U.S. Pat. No. 3,667,698 issued June 6, 1972 to Fisher, U.S. Pat. No. 3,944,163 issued Mar. 16, 1976 to Yoshio Hayashi et al, etc.).

Many of such prior art automatic locking retractors are of such a type that they are each constructed of a pair of cog wheels integral with a take-up spindle, on which a webbing is releasably wound up, and a lock lever normally urged or biased in a direction capable of engaging with the cog wheels and controlled by a cam plate.

An automatic locking retractor of the above type is however accompanied by an inconvenience that an unpleasant noise is produced due to contact between the cog wheels and lock lever particularly when winding the webbing into the retractor, because the lock lever is normally urged in the direction capable of engaging with the cog wheels. Since these cog wheels and lock lever have to be made of a metal as forces are exerted thereto, it is considerably difficult to lower the contacting noise between these metal parts.

It has been proposed, with a view toward solving the above problem, to interpose a yielding or buffer member such as a resin parts between the lock lever and its matching cog wheels. This has however developed another problem that impact noises are in turn produced between the metal parts and the yielding or buffer member.

SUMMARY OF THE INVENTION

With the foregoing problems in view, it is an object of this invention to provide an automatic locking retractor which does not produce any substantial unpleasant noise by holding the metal parts or the metal parts and the yielding or buffer member out of contact when the webbing is taken up and restrains the webbing from being pulled out without failure when the once-pulled out webbing is slightly wound back and is thereafter pulled out again.

In one aspect of this invention, there is thus provided an automatic locking retractor equipped with a casing, a take-up spindle rotatably supported on the casing and urged in the winding direction of a webbing, a cog wheel mounted integrally on the take-up spindle, a ratchet wheel and latch gear integrally rotatably together with the cog wheel, a lock lever displaceable between a first position where the lock lever is in engagement with the cog wheel and a second position where the lock lever permits free rotation of the cog wheel, a pawl displaceable between an engagement position where the pawl is in engagement with the ratchet wheel, an intermediate position where the pawl is engageable with the ratchet wheel and a non-engagement position where the pawl is kept out of engagement with the ratchet wheel, a control member normally biased to a position where the control member is engageable with the latch gear and capable of assuming a first working position where the control member is brought into contact with the path of rotation of the circumference of the latch gear by a rotation of the take-up spindle in the pulling-out direction of the webbing and a second working position where the control member is brought into contact with the path of rotation of the circumference of the latch gear by a rotation of the take-up spindle in the winding direction of the webbing, and sensor means coupled with the pawl and adapted to hold the pawl in the non-engagement position when the webbing has been wound up over at least a predetermined length, in which automatic locking retractor the control member moves toward the first working position and is brought into engagement with the pawl and the pawl assumes the non-engagement position when the webbing which has been wound up on the take-up spindle is pulled out, the control member moves toward the second working position and is disengaged from the pawl and the pawl moves to the intermediate position when the webbing has been wound back over a predetermined small length, and the pawl is then guided to the engagement position when the webbing is pulled out again; and the lock lever is displaced from the second position to the first position as the pawl is displaced from the intermediate position to the engagement position.

The automatic locking retractor according to this invention does not produce any substantial unpleasant noise, because the lock lever and cog wheel are so constructed that they are kept out of any direct contact when winding the webbing in the retractor. It also has another excellent advantage that the lock lever is kept in engagement with the cog wheel without failure and the webbing is restrained from any further release because the movement of the pawl is controlled by the movement of the control member which is biased to the position where the control member is engageable with the latch gear rotating integrally with the cog wheel, and the pawl assumes a position where the pawl is engageable with the ratchet wheel when the once-pulled out webbing is slightly wound back and, when it is then tried to pull the webbing out again, the pawl moves to the engagement position and have the lock lever engage with the cog wheel.

The above and other objects, features and advantages of the present invention will become more apparent from the following description and the appended claims, taken in conjunction with the accompanying drawings.

DETAILED DESCRIPTION OF THE INVENTION AND PREFERRED EMBODIMENT

Figure 1:
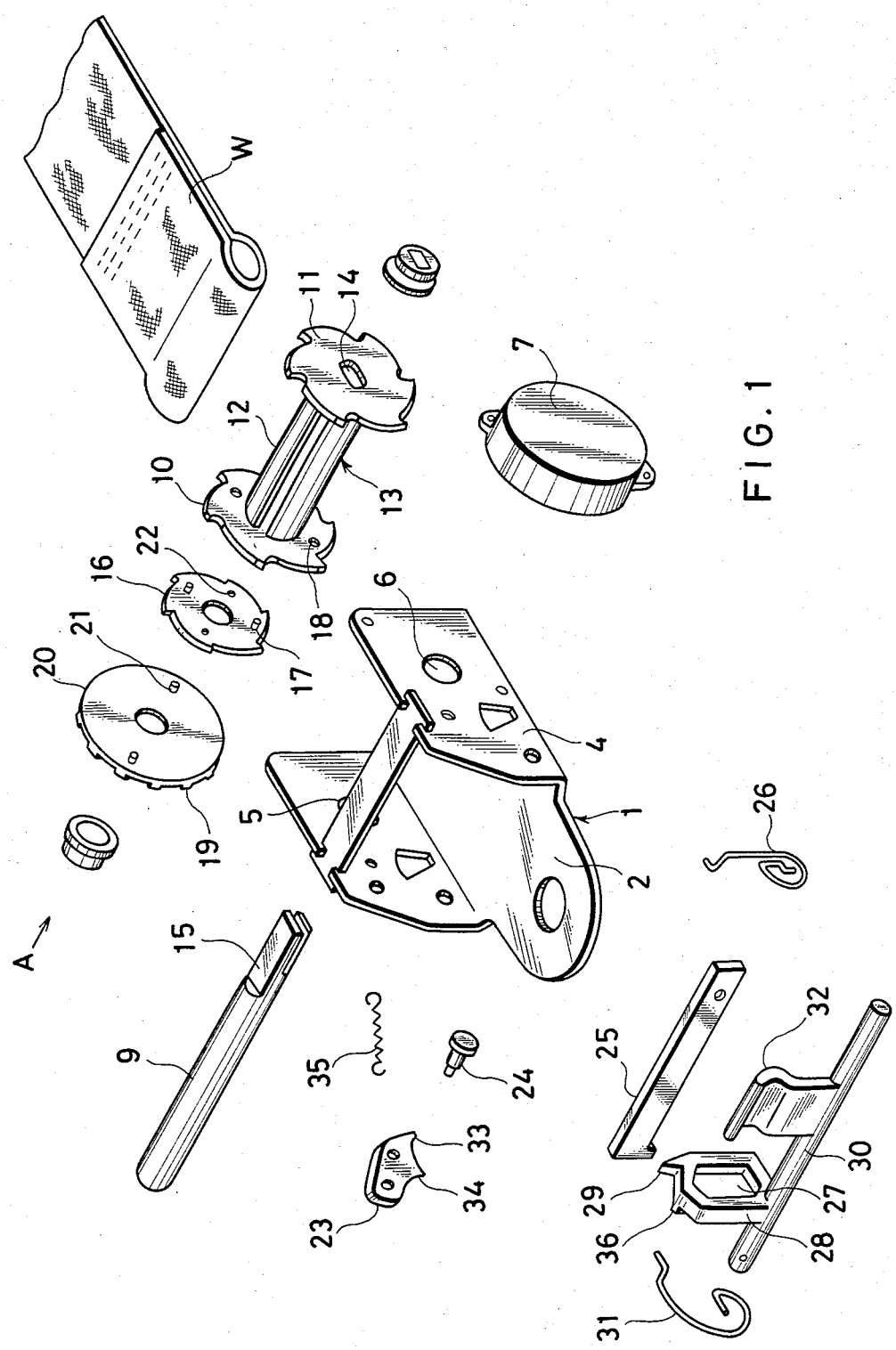
FIG. 1 is an exploded perspective view of an automatic locking retractor according to one embodiment of this invention.
Figure 2:
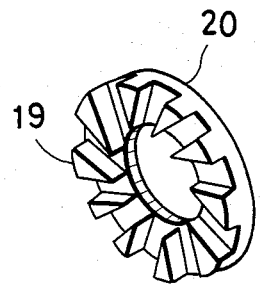
FIG. 2 is a perspective view of the latch gear, seen in the direction A in FIG. 1.
Figure 3:
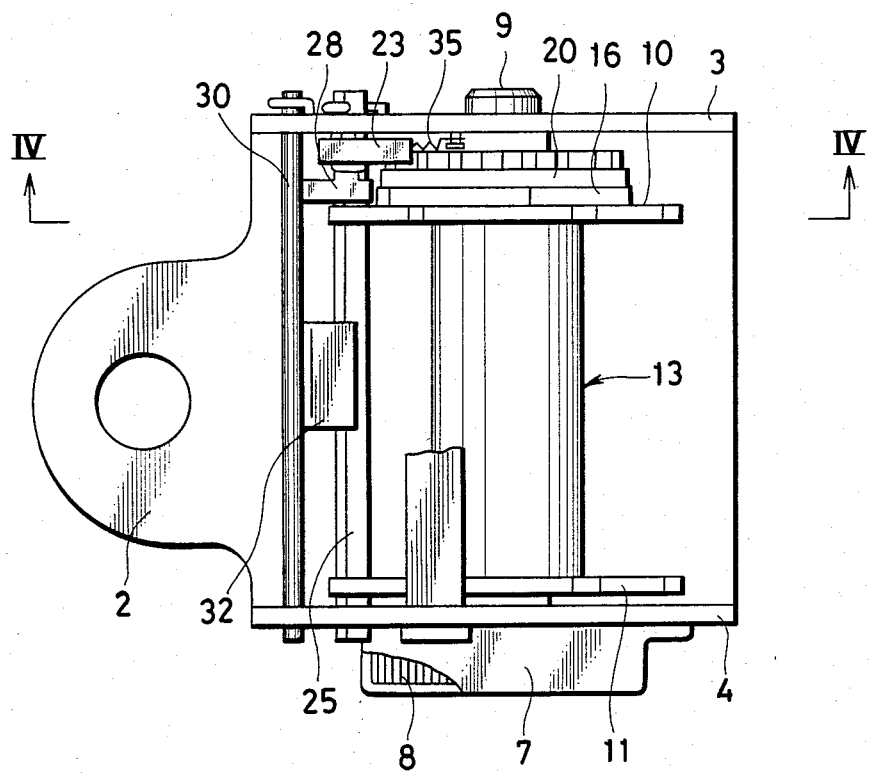
FIG. 3 is a plan view of the automatic locking retractor of FIG. 1.

Referring first to FIGS. 1 to 4, a casing 1 has a base 2 and a pair of side plates 3,4 extending substantially upright from the base 2. Spindle holes 5,6 are bored through the side plates 3,4 at substantially central parts thereof. In the spindle holes 5,6, is rotatably supported a take-up spindle 9 which is applied with a rotary force normally urged in the webbing-winding direction (namely, in the clockwise direction in FIG. 1) by means of a take-up spring 8 housed in a spring cover 7. On the take-up spindle 9, there are mounted a pair of cog wheels 10,11 each having teeth formed with a constant interval on the outer circumference thereof and a reel 13 having a cylindrical portion 12 which connnects the cog wheels 10,11 to each other. The reel 13 is rotated integrally with the take-up spindle 9 because a fitting hole 14 of the cog wheel 11 is pressfit over a bevelled end portion 15 of the take-up spindle 9. One end of the webbing W is fastened between the take-up spindle 9 and the reel 13 by a method known per se in the art.

Outside the other cog wheel, i.e., the cog wheel 10, there is provided a ratchet wheel 16 which defines the same number of teeth as the cog wheels on the outer circumference thereof and is preferably made of a resin. The ratchet wheel 16 may be rotated integrally with the cog wheels because pins 17,17 are respectively pushed in bores 18,18 formed through the cog wheel 10.

Between the ratchet wheel 16 and side plate 3, there is also provided a latch gear 20 which defines a number of lands 19 (see, FIG. 2) on the side facing the side plate 3 and is preferably made of a resin. The latch gear 20 is rotatable integrally with the ratchet wheel 16 because its pins 21 are fit in bores 22 formed through the ratchet wheel 16. Since the ratchet wheel 16 rotates integrally with the cog wheel 10 as mentioned above, the latch gear 20 is thus allowed to rotate integrally with the cog wheel 10 and take-up spindle 9.

In the proximity of the latch gear 20, a control lever 23 is provided as a control member pivotal about a pivot 24 fixedly provided on the side plate 3. The control lever 23 has a first arm 33 which engages with the lands 19 of the latch gear 20 and a second arm 34 which engages with a pawl 28. The pawl 28 will be described later in this specification. The control lever 23 is normally biased by a spring 35 provided with the side plate 3 in such a way that the first arm 33 assumes a position where it is engageable with either one of the lands 19 of the latch gear 20, namely, a position where the first arm 33 is located inside the path of rotation of the circumference of the latch gear 20.

A lock lever 25 extends between the side plates 3 and 4 of the casing 1 and in front of the reel 13 in such a way that the lock lever 25 is displaceable between a first position, where it is kept in engagement with the cog wheels 10,11 to restrain the cog wheels 10,11 from rotation, and a second position where the lock lever 25 permits free rotation of the cog wheels 10,11. The lock lever 25 is normally urged in the counterclockwise direction, in other words, toward the second position where it is out of engagement with the cog wheels 10,11, owing to the biasing force of a lever spring 26.

The pawl 28, which is preferably made of a resin, is provided in such a way that the lock lever 25 is received in a hollow part 27 of the pawl 28. The pawl 28 is provided with an edge 29 and a projection 36 which is engageable with the second arm 34 of the control lever 23. The edge 29 is engageable with the ratchet wheel 16. The pawl 28 is normally urged in a direction in which the edge 29 is engageable with the ratchet wheel 16, because a support shaft 30 constructed as a unitary member with the pawl 28 is urged in the clockwise direction by means of a spring 31. On the support shaft 30, a sensing piece 32 is also provided as a unitary member so as to sense the wound-up length of the webbing W.

Next, operation of the automatic locking retractor according to the above embodiment will be described with reference to FIGS. 4 through 8. In FIGS. 5 through 8, the casing 1 is omitted.

Figure 4:
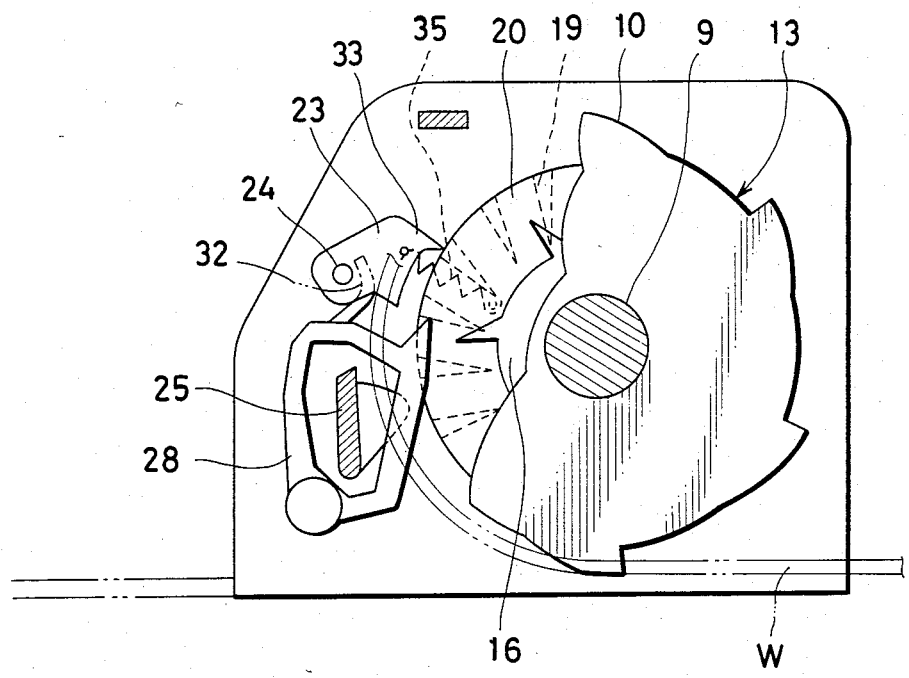
FIG. 4 is a cross-sectional view of the automatic locking retractor, taken along line IV—IV of FIG. 3.

In FIG. 4, the webbing W is in a wound-up state. Here, the sensing piece 32 has been pushed outwards by the thus-wound webbing W and the pawl 28, which is integral with the sensing piece 32, is thus held in the non-engagement position where the pawl 28 is not engageable with the ratchet wheel 16. On the other hand, the lock lever 25 is urged in the counterclockwise direction by the lever spring 26 and is held in the second position where it permits free rotation of the cog wheels 10,11. The control lever 23 whose first arm 33 is in an engageable state with the latch gear 20 turns counterclockwise about the pivot 24 when the latch gear 20, which rotates integrally with the take-up spindle 9, turns in the webbing-winding direction (i.e., clockwise direction in the drawing). Thus, the control lever 23 is pushed to either the second working position where it is kept in contact with the path of rotation of the circumference of the latch gear 20 as shown in FIG. 4 or a position where the first arm 33 is located between mutually-adjacent two lands 19 of the latch gear 20 and the control lever 23 has been turned slightly in the clockwise direction from the position illustrated in FIG. 4.

Figure 5:
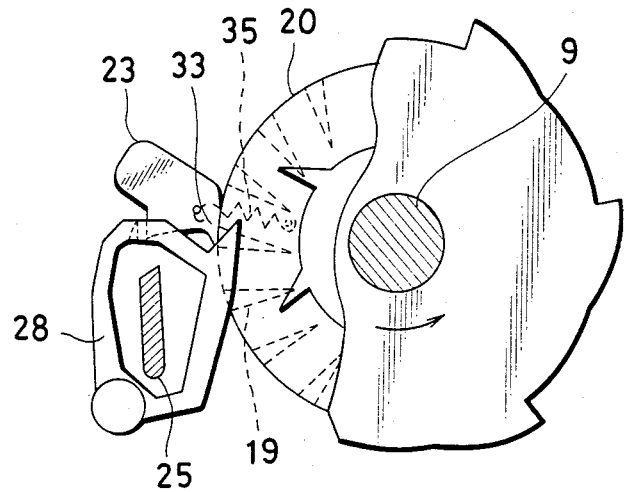
FIGS. 5 through 8 are partially cut-away, simplified, cross-sectional views of the automatic locking retractor of FIG. 1, illustrating the operation of the retractor in four different stages respectively.

When the occupant in the vehicle seat pulls out the webbing W to wear it, the reel 13 which is integral with the take-up spindle 9 and the ratchet wheel 16 and latch gear 20 which are in turn integral with the reel 13 are rotated in the counterclockwise direction against the biasing force of the take-up spring 8. By the turning motion of the take-up spindle 9 in the pulling-out direction of the webbing W, the control lever 23 which is normally biased owing to the provision of the spring 35 to the position where it is engageable with the latch gear 20 is turned in the clockwise direction about the pivot 24 because the turning force of the latch gear 20 is transmitted to the control lever 23. Thus, the control lever 23 moves to the first working position where the control lever 23 is kept in contact with the path of rotation of the circumference of the latch gear 20. This state is shown in FIG. 5. When the webbing W is pulled out further from the state shown in FIG. 5 and the latch gear 20 is turned counterclockwise, the first arm 33 of the control lever 23 is disengaged from the land 19 of the latch gear 20 and the control lever 23 is thus turned slightly in the counterclockwise direction by the biasing force of the spring 35. However, this turning motion of the control lever 23 is allowed to continue only until the first arm 33 is brought into abutment with the adjacent land 19. When the latch gear 20 turns further, the control lever 23 is then turned clockwise to the first working position while the abutment of the first arm 33 and the land 19 is maintained. The control lever 23 undergoes the above movement repeatedly as long as the webbing W is pulled out.

Figure 6:
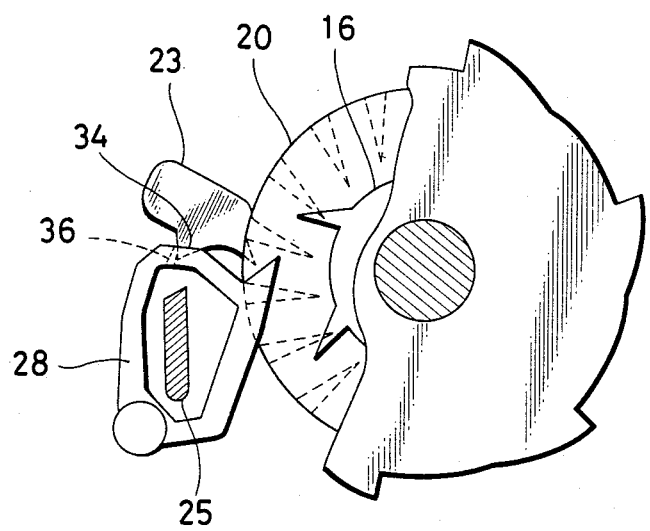

At this time, the thickness of the webbing W on the reel 13 becomes thinner as the webbing is pulled out. Reflecting the decreasing thickness of the webbing, the sensing piece 32 which is kept in contact with the webbing is turned clockwise by virture of the biasing force of the spring 31. Accordingly, the pawl 28 is also turned clockwise because it is integral with the sensing piece 32. The pawl 28 cannot however turn beyond a certain limit because, preceding the turning movement of the pawl 28, the control lever 23 has already moved to a position turned clockwise from the previous position and the projection 36 has been brought into abutment with the second arm 34 of the control lever 23. This state is shown in FIG. 6. Consequently, the pawl 28 is continuously held in a position where it is out of engagement with the ratchet wheel 16. On the other hand, the lock lever 25 is continuously kept in the same position as that illustrated in FIG. 4. Therefore, it is still possible to pull out the webbing W and the control lever 23 and the pawl 28, which is kept in engagement with the control lever 23, repeatedly undergo slight turning movements and the lock lever 25 is held continuously at the position illustrated in FIG. 6 until the pulling-out motion of the webbing is stopped.

As soon as the occupant has worn the webbing following the stop of the pulling-out motion of the webbing W, the webbing is slightly wound back over any extra length. This causes the ratchet wheel 16 to rotate in the clockwise direction, thereby rotating the latch gear 20 clockwise since the latch gear 20 rotates together with the ratchet wheel 16. Owing to this rotation of the latch gear 20, the control lever 23 which is normally kept in the position where it is engageable with the latch gear 17 is turned counterclockwise. Thus the control lever 23 moves toward the second working position. This state is illustrated in FIG. 7.

At this stage, the pawl 28 is released from the engagement with the control lever 23. The pawl 28 is thus allowed to turn clockwise slightly from the position shown in FIG. 6 owing to the biasing force of the spring and hence assumes the intermediate position. In the intermediate position, the edge 29 of the pawl 28 is engageable with the ratchet wheel 16.

On the other hand, the lock lever 25 is still kept in the second position and permits free rotation of the cog wheels 10,11 as in FIG. 4.

Figure 7:
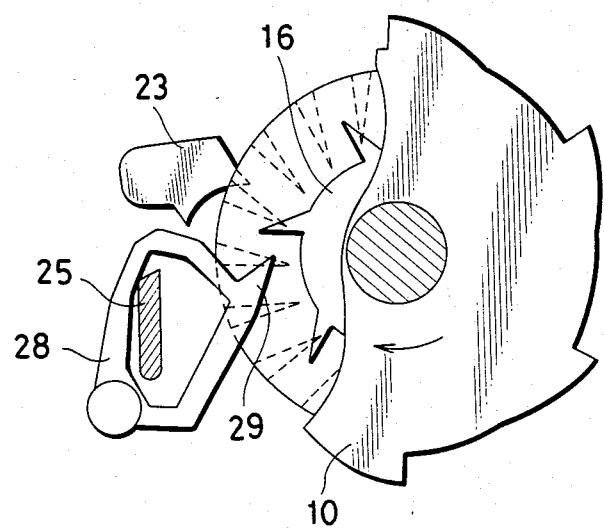
Figure 8:
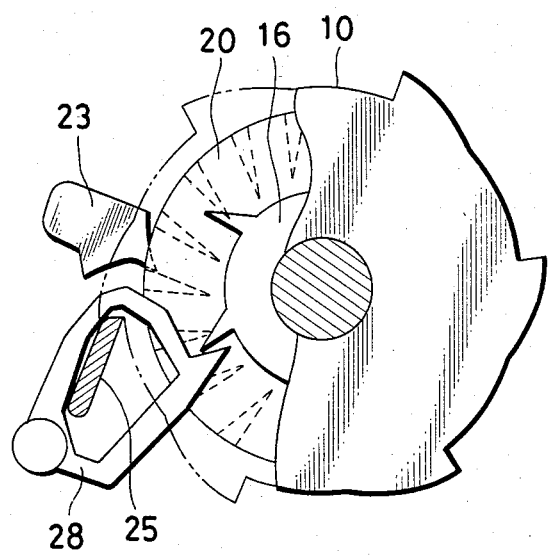

If the webbing is again applied with a pulling force in the state shown in FIG. 7, for example, in the event of an emergency such as vehicle collision or the like, the pawl 28 which has been held in the above-mentioned intermediate position is brought into engagement with the ratchet wheel 16 and is turned to the engagement position as shown in FIG. 8. Owing to this turning movement of the pawl 28, the lock lever 25 is caused to swing to the first position where it is brought into engagement with the cog wheels 10,11. Accordingly, the cog wheels 10,11, in other words, the take-up spindle 9 is restrained from any further rotation and the pulling-out of the webbing W is restrained, thereby protecting the occupant safely.

Since the pawl 28 and ratchet wheel 16 and the lock lever 25 and cog wheel 10 are respectively synchronized so as to have the lock lever 25 assume the first position when the pawl 28 has reached the engagement position, there is no danger to encounter such a state that the lock lever 25 hits the tips of teeth of the cog wheels 10,11 and is knocked off and thus unable to engage with the cog wheels 10,11.

In the state shown in FIG. 7, the pawl 28 is held in the intermediate position where it is engageable with the ratchet wheel 16. Therefore, the pawl 28 is brought into the state shown in FIG. 8 without any failure when the webbing W is pulled out subsequently, thereby restraining any further release of the webbing.

When the occupant takes off the webbing W, the webbing W is wound back by the biasing force of the take-up spring 8. The retractor is thus brought first into the state shown in FIG. 7 and then into the state illustrated in FIG. 4. Upon winding back the webbing, i.e., in the state shown in FIG. 7, the lock lever 25 and cog wheels 10, 11 are not kept in engagement at all as mentioned above. Therefore, there is no danger that the metal parts are brought into contact and an unpleasant noise is thus produced.

It should be borne in mind that the above embodiment has been given by way of example only. Needless to say, a variety of designing modifications and changes may be made thereto so long as such modifications and changes do not depart from the principal features of this invention. It may for example be contemplated:

(1) to employ only one cog wheel instead of the two cog wheels 10,11;
(2) to provide the cog wheels, ratchet wheel, control lever and pawl outside the side plates of the casing; or
(3) to use a control member supported slidably on the casing instead of the control lever supported pivotally on the casing.

In the above embodiment, the lock lever 25 and pawl 28 are movable relative to each other. However, it is not essential to construct the lock lever and pawl in the above manner. It may be possible to achieve the same effect as the illustrated embodiment even if the lock lever and pawl are formed integrally, provided that the pawl is urged toward the engagement position (in other words, the lock lever which is integral with the pawl is urged toward the first position).

Having now fully described the invention, it will be apparent to one of ordinary skill in the art that many changes and modifications can be made thereto without departing from the spirit or scope of the invention as set forth herein.

What is claimed is:

1. An automatic locking retractor comprising:
   a casing;
   a take-up spindle rotatably supported on the casing and urged in the winding direction of a webbing;
   a cog wheel mounted integrally on the take-up spindle;
   a ratchet wheel and latch gear integrally rotatable together with the cog wheel;
   a lock lever displaceable between a first position where the lock lever is in engagement with the cog wheel and a second position where the lock lever permits free rotation of the cog wheel;
   a pawl displaceable between an engagement position where the pawl is in engagement with the ratchet wheel, an intermediate position where the pawl is engageable with the ratchet wheel and a non-engagement position where the pawl is kept out of engagement with the ratchet wheel;

a control member normally biased to a position, where the control member is engageable with the latch gear, and capable of assuming a first working position where the control member is brought into contact with the path of rotation of the circumference of the latch gear by a rotation of the take-up spindle in the pulling-out direction of the webbing and a second working position where the control member is brought into contact with the path of rotation of the circumference of the latch gear by a rotation of the take-up spindle in the winding direction of the webbing; and sensor means coupled with the pawl and adapted to hold the pawl in the non-engagement position when the webbing has been wound up over at least a predetermined length;

wherein the control member moves toward the first working position and is brought into engagement with the pawl and the pawl assumes the non-engagement position when the webbing which has been wound up on the take-up spindle is pulled out, the control member moves toward the second working position and is disengaged from the pawl and the pawl moves to the intermediate position when the webbing has been wound back over a predetermined small length, and the pawl is then guided to the engagement position when the webbing is pulled out again; and means for displacing the lock lever from the second position to the first position as the pawl is displaced from the intermediate position to the engagement position.

2. The automatic locking retractor as claimed in claim 1, including means for pivotally supporting the control member on the casing.

3. The automatic locking retractor as claimed in claim 1, including means mounting the lock lever and pawl for movement relative to each other.

4. The automatic locking retractor as claimed in claim 3, including means for urging the lock lever toward the second position and means for urging the pawl toward the engagement position.

5. The automatic locking retractor as claimed in claim 4, wherein the means for displacing comprises means on said pawl for engaging the lock lever when the pawl has moved over at least a predetermined distance.

6. The automatic locking retractor as claimed in claim 1, wherein the control member has a first arm engageable with the latch gear and wherein the means for displacing comprises a second arm on the control member engageable with the pawl.

* * * * *